United States Patent [19]
Belk

[11] 3,848,724
[45] Nov. 19, 1974

[54] ACCUMULATOR FOR FRAGILE ARTICLES
[75] Inventor: Wilber C. Belk, Lakeland, Fla.
[73] Assignee: FMC Corporation, San Jose, Calif.
[22] Filed: Jan. 14, 1974
[21] Appl. No.: 433,173

[52] U.S. Cl..................... 198/29, 53/159, 198/103, 198/209
[51] Int. Cl............................................ B65g 47/22
[58] Field of Search......... 198/29, 37, 103, 34, 209, 198/DIG. 19; 53/159

[56] References Cited
UNITED STATES PATENTS
2,855,740  10/1958  Holand et al. .................... 198/37 X
3,139,176   6/1974  Bliss................................... 198/168
FOREIGN PATENTS OR APPLICATIONS
137,469   6/1950  Australia............................. 198/103

Primary Examiner—Richard A. Schacher
Assistant Examiner—Douglas D. Watts
Attorney, Agent, or Firm—R. S. Kelly; C. E. Tripp

[57] ABSTRACT

Apparatus for accumulating fragile articles includes a continuously rotating turntable. The articles, which in the disclosed embodiment of the invention comprise whole peeled grapefruit, are fed continuously and in random arrangement on a delivery conveyor to the turntable. The turntable is provided with a radially inwardly sloping article supporting surface and is driven at a relatively slow speed so that the incoming articles move toward the center thereof and will be distributed uniformly thereabout. When the articles have accumulated so as to fill the turntable, an article sensing switch arm positioned adjacent the outer periphery of the turntable will be actuated to elevate the turntable to an article discharge position by pivoting it about one edge thereof thereby causing the articles to gravitate onto a discharge conveyor which is started by the actuation of said article sensing switch arm and moved for a distance sufficient to accommodate the accumulated full load of articles from the turntable.

15 Claims, 6 Drawing Figures

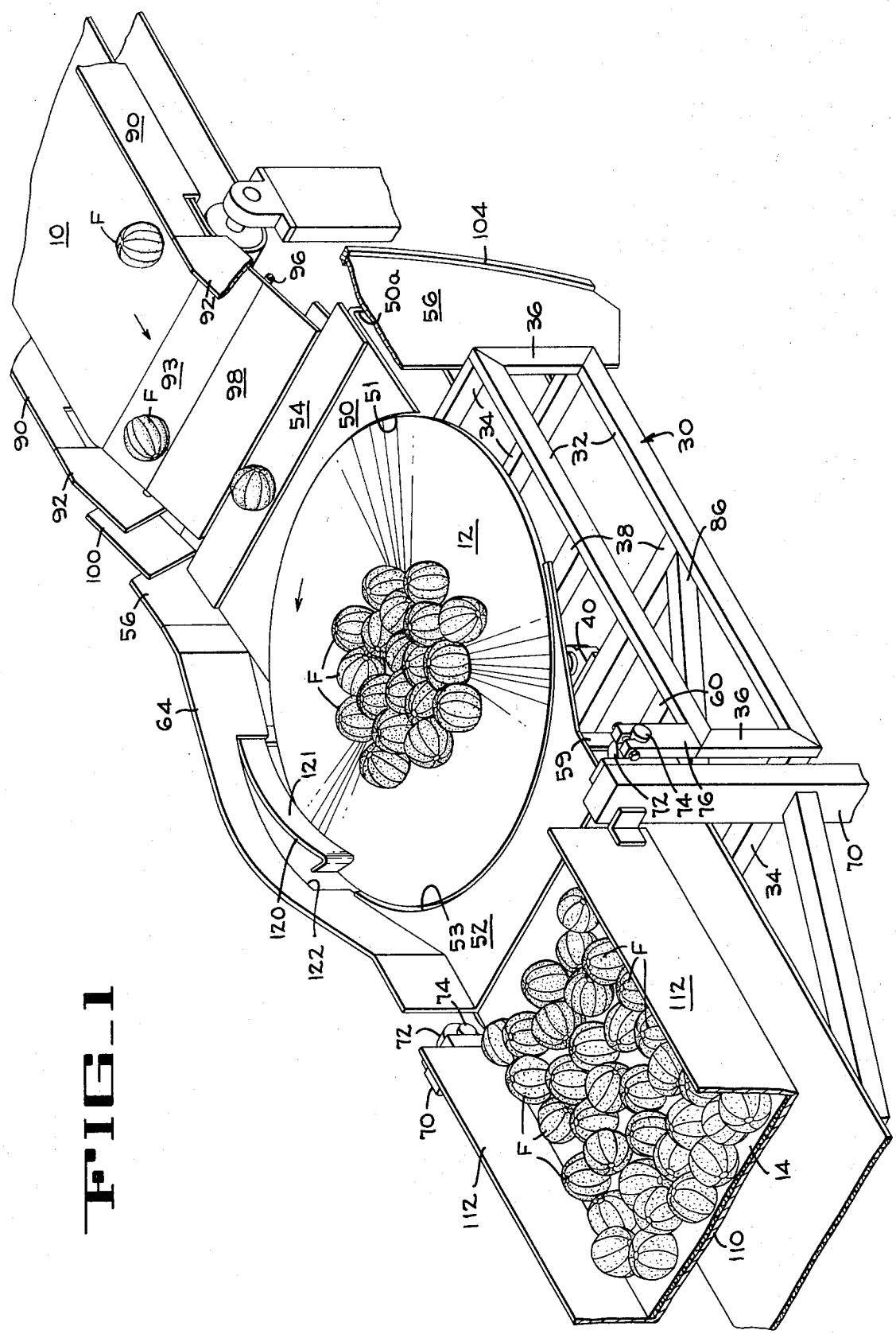

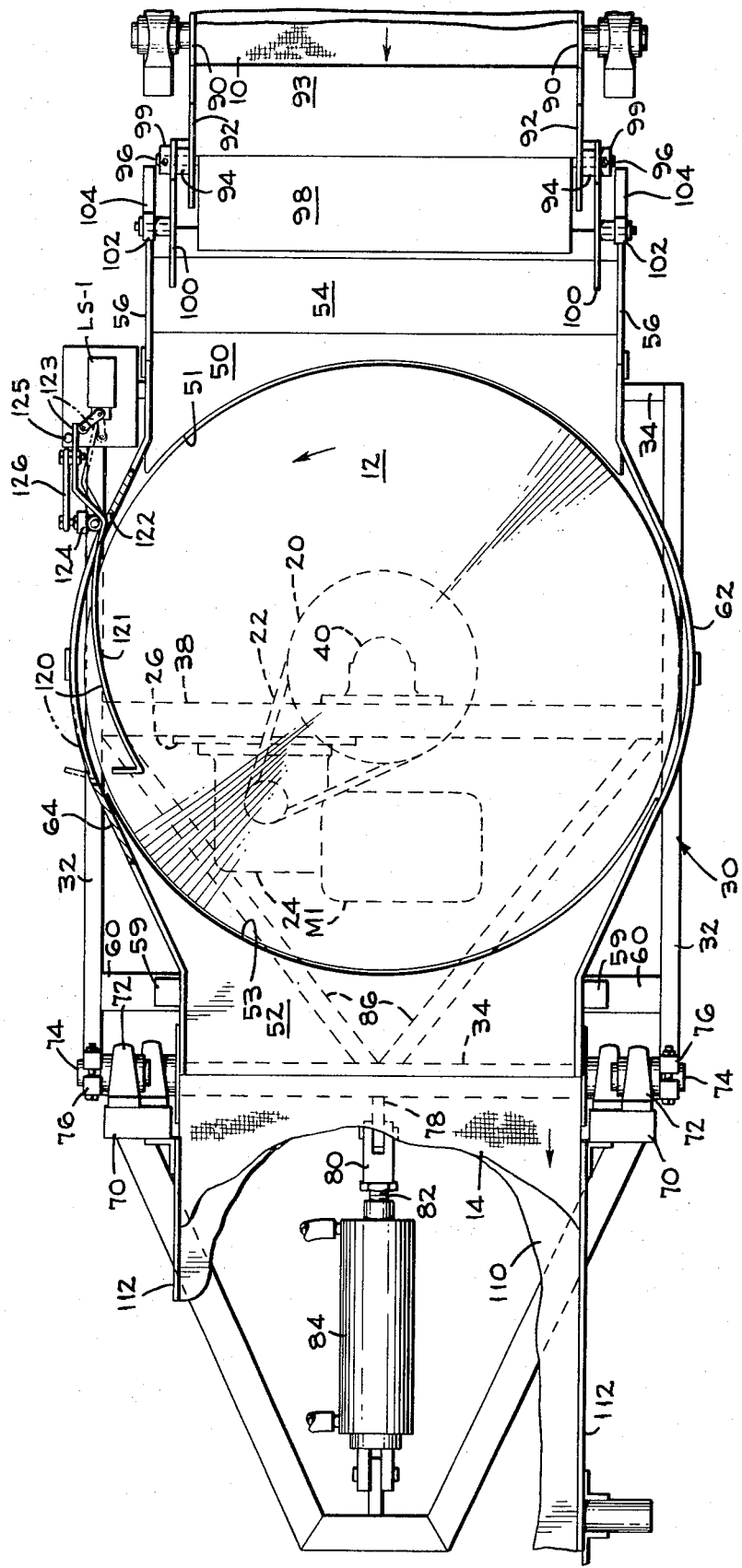

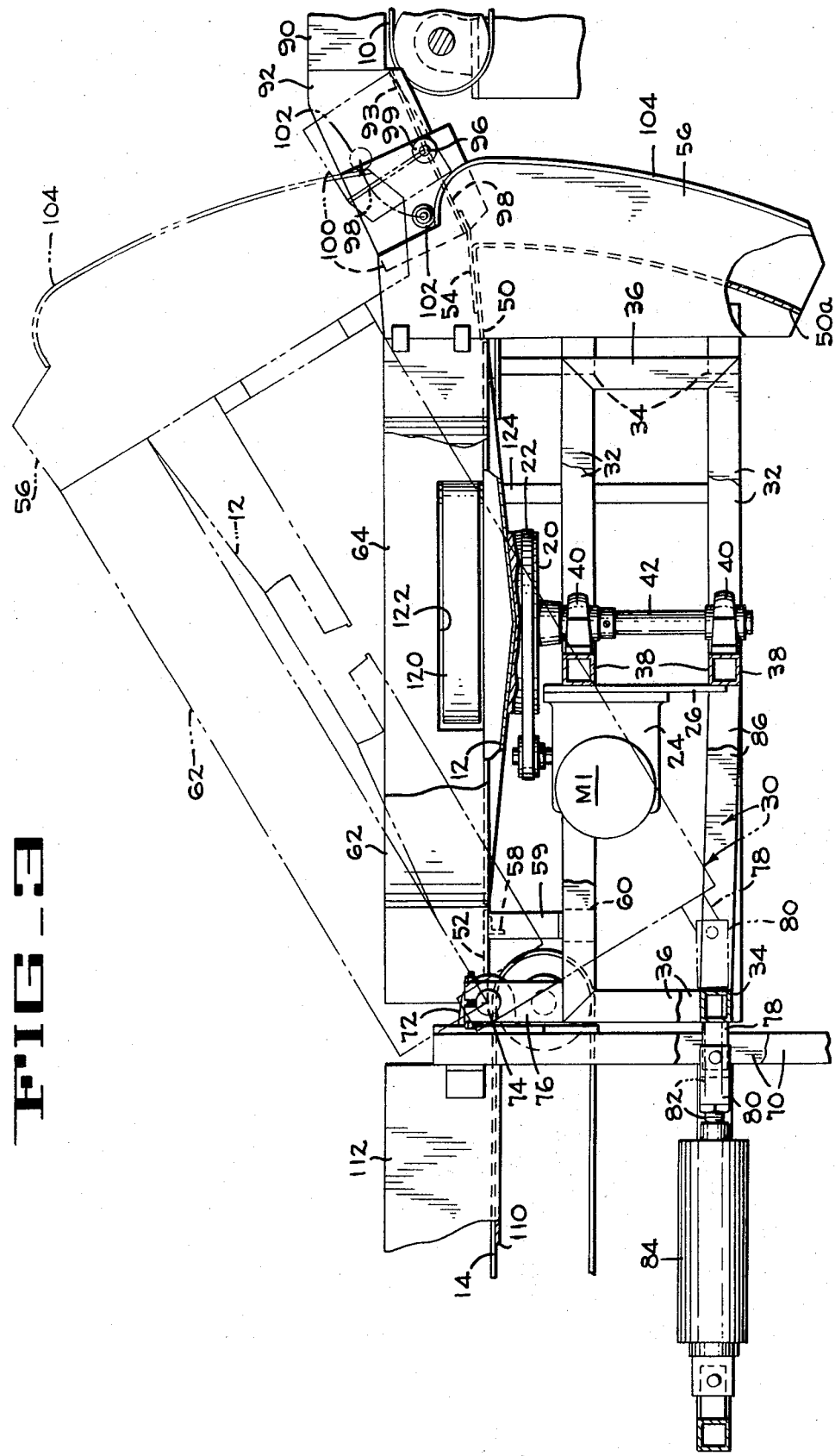

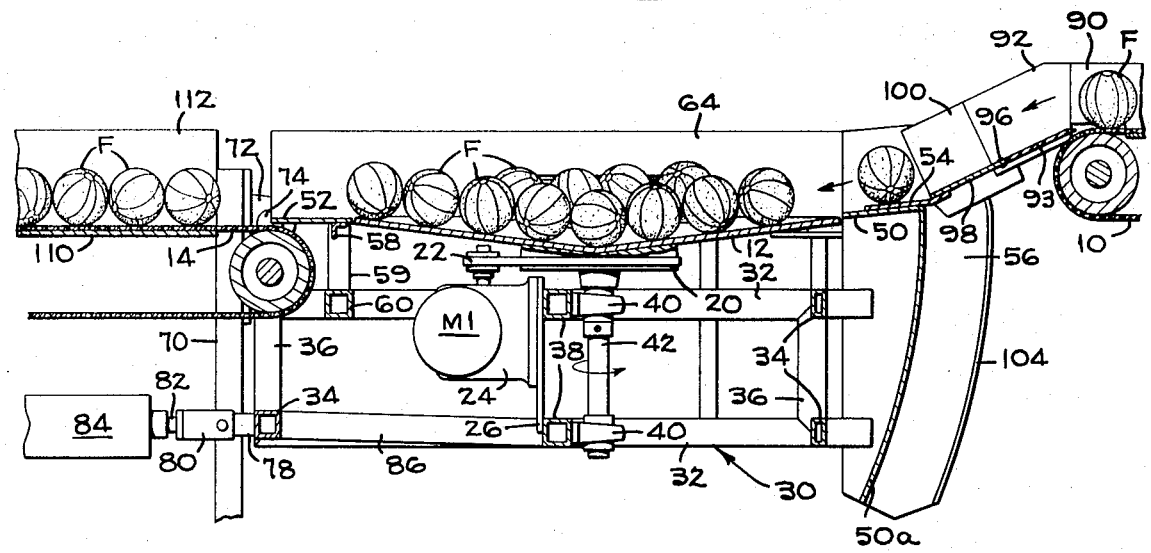
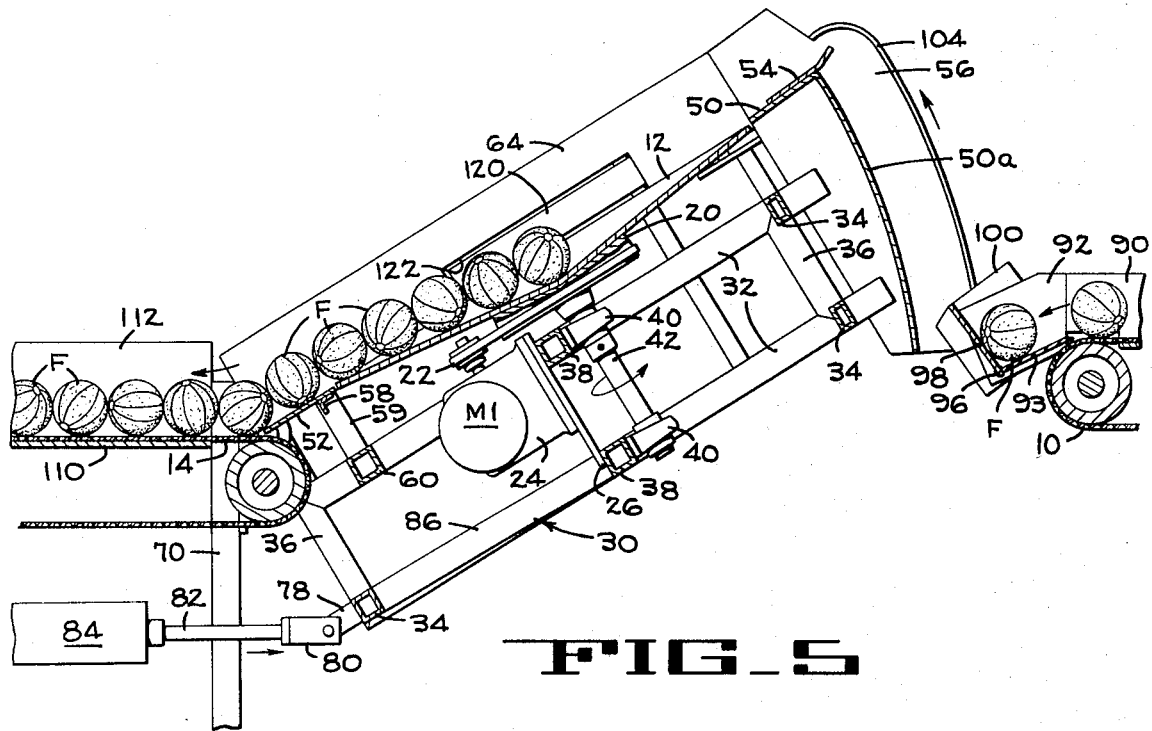

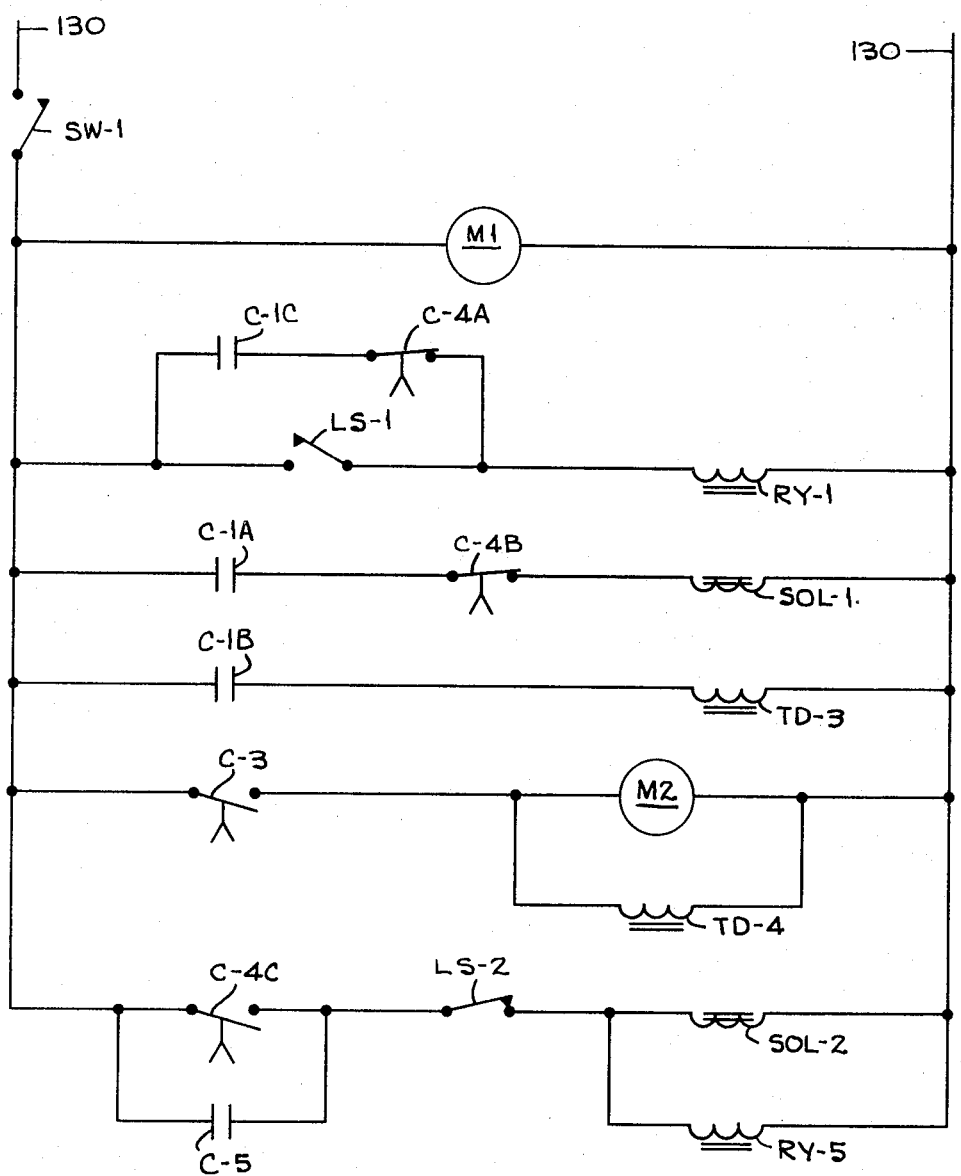
FIG_6

ACCUMULATOR FOR FRAGILE ARTICLES

BACKGROUND OF THE INVENTION

1. Field of the Invention

The present invention pertains to apparatus for accumulating articles, and more particularly, it pertains to apparatus for accumulating relatively fragile articles in a continuous, horizontally arranged conveying system.

2. Description of the Prior Art

In large scale, free flowing conveying systems as used in industry today it frequently happens that there is a need for an accumulating apparatus to serve as a temporary buffer storage zone. For example, where one portion of an article processing system operates with a random output and where a downstream portion of the processing system requires a regulated input, it is usually necessary to include an accumulator between the two portions of the system in order to maximize the efficiency of the system. Such article processing systems, for example, might include the various separate mechanisms and interconnected conveyors for the processing of fruit, vegetables or other produce or they might include the systems for the processing and continuous handling of various types of containers.

There are many types of continuous article accumulators which have been used since the introduction of large scale article handling and conveying systems to the industrial scene. The simplest and most widely used of such accumulators merely include some type of controlled stop means and a frictional conveying and support means which causes the articles to accumulate against the stop means. An example of such an accumulator as used in the egg handling industry is shown in U.S. Pat. No. 3,139,176 to Bliss. Such accumulators are generally satisfactory for handling most articles, but they have proven to be unsatisfactory where the articles to be accumulated are relatively fragile since the pressures exerted upon an accumulated mass of such articles can cause extensive damage to the individual articles.

Accumulator systems for handling relatively fragile articles have heretofore been provided wherein the articles are carried by conveyors in predetermined arrangements so that driving power can be selectively removed from the conveyed articles in the accumulating zone. For example, the so-called "zero pressure" conveyors provide such an accumulator conveying system. However, there is not generally available a low cost accumulator for handling freely moving and randomly arranged articles of a relatively fragile nature wherein the pressures on the individual articles in an accumulated mass of articles are successfully eliminated or significantly reduced.

SUMMARY OF THE INVENTION

The accumulator of the present invention is desgined to continuously accumulate relatively fragile articles which are fed thereto in wholly arbitrary and random arrangements upon conventional conveyors such as the typical endless belt conveyors. The accumulator comprises a turntable which is provided with an article supporting surface that is radially inwardly sloped and which is adapted to be continuously rotated at a relatively slow speed so that the articles fed thereto will gravitate toward the center of the turntable with a spiral movement and will have a generally uniform radial distribution on the turntable as they accumulate. When the turntable is filled with the accumulated articles, this condition will be sensed and means are provided to tilt the turntable to discharge the accumulated articles therefrom en masse.

The apparatus of the present invention has been found to be particularly useful in the temporary accumulation of whole peeled grapefruit which are obviously of a quite fragile nature. When such fruit are fed to processing machines, such as grapefruit sectionizing machines for example, the overflow must be accumulated and fed back to the system during times when the input to the system is down. Not only would normal back pressures on an accumulated mass of grapefruit damage the individual fruit, but the release of the highly corrosive grapefruit juice onto the accumulating apparatus would cause a clean-up problem which would seriously reduce the efficiency of the grapefruit conveying and accumulating system. The apparatus of the present invention serves to rotate the accumulating mass of grapefruit about a fixed axis with a minimum of pressure on the individual fruit until a sufficient quantity has been accumulated. At such time, the turntable is elevated to discharge the fruit to a holding surface.

In the preferred embodiment of the invention, an intermittently driven discharge conveyor is operated in conjunction with the accumulating turntable to receive the full load of accumulated articles from the turntable when it is tilted upwardly. The discharge conveyor, which is actuated by the load sensing means of the turntable, is driven for a distance sufficient to just accommodate the accumulated load of articles from the turntable. The movement of the discharge conveyor is coordinated with the upward movement of the turntable so that the articles will be fed uniformly from the turntable to the discharge conveyor to completely fill up the newly available space on the conveyor.

The apparatus of the present invention provides a relatively low cost solution to the problem of accumulating relatively fragile articles. This apparatus has been found to operate efficiently at relatively high, i.e., commercial, processing speeds and with relatively large quantities of accumulated articles.

BRIEF DESCRIPTION OF THE DRAWINGS

FIG. 1 is an isometric view of the accumulator apparatus of the present invention.

FIG. 2 is a plan of the accumulator apparatus of FIG. 1 with portions thereof being broken away for the purpose of illustration.

FIG. 3 is a side elevation of the accumulator apparatus of FIG. 1 with portions thereof being broken away, said figure showing the normal fruit receiving position of the turntable in full lines and the tilted discharge position of the turntable in phantom lines.

FIG. 4 is a diagrammatic longitudinal section of the apparatus of the present invention illustrating the manner in which grapefruit are accumulated upon the turntable.

FIG. 5 is a diagrammatic longitudinal section similar to FIG. 4 but illustrating the discharge position of the turntable wherein the grapefruit are caused to gravitate to the discharge conveyor.

FIG. 6 is a schematic diagram of the electrical circuitry of the present invention.

DESCRIPTION OF THE PREFERRED EMBODIMENT

Referring first to FIG. 1 of the drawings, it will be seen that the accumulating system of the present invention is designed to continuously accumulate whole peeled grapefruit F which are received on a random basis from a continuously driven endless belt delivery conveyor 10. The delivery conveyor discharges the fruit to the periphery of a turntable 12 which is arranged to be continuously rotated, in the direction of the arrow shown in FIG. 1, by means to be explained in greater detail hereinafter. The turntable has an upper fruit-supporting surface which is sloped radially inwardly to the center thereof, and the rotational speed on the turntable is such that the fruit will gravitate in a more or less spiral path down to the center of the turntable to accumulate therein a uniform mass as shown in FIG. 1. When the turntable is filled, means are provided for sensing such condition and the turntable is tilted upwardly (FIG. 5) to discharge the accumulated mass of fruit to a discharge conveyor 14. The discharge conveyor 14 comprises an endless belt conveyor similar to delivery conveyor 12 and is positioned at a location diametrically opposite from the location of the delivery conveyor 10 with respect to the turntable. The discharge conveyor is arranged to be intermittently driven, and the movement of the discharge conveyor is coordinated with and controlled by the upward tilting movement of the turntable so that the discharge conveyor will move forwardly by an incremental distance which will just accommodate the load of fruit from the turntable and in a manner whereby the fruit will be fed uniformly from the turntable to the discharge conveyor to fill up all of the newly available space therein and without exerting any undue pressure on the individual fruit. This timing and coordination of the turntable and discharge conveyor movements can be achieved by relative adjustment of the various electrical control devices to be described hereinafter.

Referring now to FIGS. 2 and 3, it will be seen that the rotary turntable 12 comprises a circular disc having an inwardly sloping support surface which slopes radially inwardly to the center of the turntable at about a five degree angle with the horizontal conveying plane of delivery conveyor 10. The turntable is mounted upon a hub 20 which is arranged to be continuously rotated by means of a drive belt 22 that is driven from a motor M1 through a gear reducer 24. During operation of the accumulator apparatus the motor M1 is driven continuously, and the gear reducer 24 reduces the speed of the drive belt 22 so that the turntable will rotate at a relatively low angular velocity in the neighborhood of about five rpm. This angular velocity is fast enough to give a rotational component of motion to the fruit F as it is received upon the outer edge of the turntable so that the fruit will not impact directly with the accumulated mass of fruit on the turntable; however, the angular velocity is not so fast as to cause the fruit F to move outwardly on the turntable under the centrifugal forces generated by the rotational movement of the turntable.

The motor M1 and gear reducer 24 are mounted upon a vertically extending mounting plate 26 which is attached to a rigid tubular frame structure which has been given the general reference numeral 30. The tubular frame structure 30 is generally rectangular in shape and includes oppositely arranged pairs of tubular side frame members 32 which are interconnected by horizontally extending tubular end frame members 34 and vertically extending tubular end posts 36. The side frame members, end frame members and end posts are all welded together at the corners so as to form a rigid rectangular frame structure. A pair of tubular frame members 38 extend transversely of the rigid frame structure at the central longitudinal portion thereof and connect the pairs of side frame members 32. The mounting plate 26, which supports the drive motor M1 and the gear reducer 24, is rigidly secured to these frame members 38. The frame members 38 also serve to mount a pair of vertically aligned bearing blocks 40 which rotatably support a vertically extending shaft 42 that carries the hub 20 and the superimposed turntable 12.

In order to provide for the conveyance of the fruit F onto and off of the turntable 12, a pair of support plates 50 and 52 are mounted upon the rigid frame structure 30 adjacent to the delivery conveyor 10 and the discharge conveyor 14, respectively. The support plate 50 includes an inner edge 51 which is arcuately curved to match the curvature at the periphery of the turntable 12 and is very closely spaced therefrom so that the fruit F will freely gravitate from the plate to the turntable. The plate 50 includes a downwardly extending skirt portion 50a (FIG. 3) adjacent to the delivery conveyor. A ramp 54 is rigidly attached to the face of the support plate 50 across the upper corner thereof to bridge the gap between the delivery conveyor and the turntable structure. The support plate 50 is secured at its side edges to a pair of vertically extending side wall plates 56 which extend upwardly above the upper level of the plate 50 and serve as side guides for the fruit entering the turntable. The plates 56 are securely attached at one end thereof to the rigid frame structure 30 (FIG. 3).

The support plate 52 is arranged adjacent the turntable 12 at a position diametrically opposite from the position of the support plate 50 and includes an inner edge 53 which is arcuate in shape to match the curvature of the circular peripheral edge of the turntable which is closely spaced therefrom. The support plate 52 is supported upon a transversely extending angle member 58 (FIG. 3) which is secured at its ends to a pair of posts 59 which are, in turn, supported by a tubular frame member 60 extending between the upper set of side frame members 32 and forming a portion of the rigid frame structure 30. The support plates 50 and 52 are interconnected by a pair of vertical side guide members 62 and 64 which extend longitudinally of the accumulator structure and include arcuately curved central portions which extend closely adjacent to the outer peripheral edge of the turntable. The members 62 and 64, which form side guide walls for the fruit as it passes through the accumulator structure, are attached (FIG. 3) at one end to the side wall plates 56 so as to form extensions thereof. The other end of each of the side guide members is securely mounted to the upper face of the tubular frame member 60 (FIG. 2).

The entire rigid frame structure 30 and the turntable 12 which it supports is mounted for pivotal movement upon a pair of upstanding posts 70 positioned at each side of the inlet end of the discharge conveyor 14. Each post 70 supports a pillow block bearing 72 which rotatably mounts one end of a transversely extending stub shaft 74. Each stub shaft is clamped at the other projecting end thereof to an upstanding bracket 76 that is securely mounted upon a corner of the tubular frame structure 30. A short mounting plate 78 is rigidly secured to the central portion of the lowermost end frame member 34 adjacent the discharge conveyor 14. The mounting plate 78 is rotatably connected to a clevis 80 at the distal end of a piston rod 82 that is driven by a double-acting pneumatic cylinder 84. Actuation of a conventional air valve (not shown) controlling the flow of air to and from the pneumatic cylinder 84 will cause the piston rod 82 to be extended and to thereby pivot the frame structure 30 about the axes of the stub shafts 74 from the full line to the phantom line position as shown in FIG. 3 of the drawings. The horizontal pushing force from the pneumatic cylinder 84 is distributed throughout the frame structure 30 by means of a pair of reinforcing posts 86 which extend diagonally across the lower portion of the frame structure, as best shown in FIG. 2.

The delivery conveyor 10 has its upper fruit supporting run carried by a conveyor bed member which includes a pair of upwardly extending side guides 90. The end port on of each of these guides includes a downwardly directed extension piece 92 which extends forwardly from the rotatably supported end of the delivery conveyor belt 10. In order to provide a means for blocking the discharge of fruit from the delivery conveyor, each of the extension pieces mounts a bushing 94 (FIG. 2) on its outwardly facing surface which, in turn, is adapted to rotatably mount a short stub shaft 96. Each stub shaft 96 has its inner end rigidly attached to a stop plate 98 which extends between the extension pieces 92 and is spaced slightly inwardly therefrom (FIG. 2). The outer end of each of the stub shafts 96 is rigidly attached to a collar 99 which is secured to a pivot plate 100. The two pivot plates 100 extend across the entrance to the accumulator structure and are provided with cam follower rollers 102 which are rotatably mounted thereon and extend laterally from the outer faces of the pivot plates. The cam follower rollers 102 are arranged to roll upon a pair of generally vertically arranged tracks 104 rigidly attached to the rearward facing edge of the side wall plates 56 (FIG. 1). As will be apparent from FIG. 3, when the rigid frame structure 30 is pivoted upwardly to discharge the accumulated fruit F from the turntable 12, the cam follower rollers 102 will be forced in an upward and rearward direction (as shown by the arrow in FIG. 3) which will, in turn, cause the stop plate 98 to pivot upwardly about the axes of the stub shafts 96 and thereby block the discharge of fruit from the ramp 93 at the end of the delivery conveyor. Thus, fruit will be prevented from entering the accumulator structure when the turntable is in any position other than its normal lowered fruit-receiving position.

The discharge conveyor 14 comprises a conventional endless belt conveyor which is mounted for rotation adjacent to the pivotal mounting of the tubular frame structure 30. The upper fruit supporting run of the discharge conveyor is supported upon a conveyor bed 110 (FIG. 1) which includes upwardly extending side guides 112 secured at their ends to the upstanding posts 70. The discharge conveyor is arranged to be intermittently driven by a conventional brake motor M2, which is shown only in the electrical schematic diagram of FIG. 6. This brake motor is operated, by control means to be described presently, so that the discharge conveyor will start to move shortly after the turntable 12 begins to move upwardly, and the discharge conveyor will continue to move for a predetermined period of time sufficient to uncover an area of conveyor surface which will just accommodate the load of fruit discharged from the turntable. The tilting movement of the turntable and the linear progression of the discharge conveyor are coordinated so that the fruit are fed uniformly from the turntable to the discharge conveyor and so that all of the conveyor space is filled.

The means for sensing a full load of fruit upon the turntable 12 comprises a switch-actuating spring arm 120 which extends above the outer peripheral portion of the turntable 12 within a slot 122 cut into one of the side guide members 64. The spring arm 120 includes a curved portion 121 at its distal end which is adapted to be engaged by the fruit at the outer circumferential portion of the turntable and a switch-actuating portion 123 at its opposite end (FIG. 2). The spring arm is hingedly mounted therebetween upon a hinge bracket structure 124 so that when the fruitcontacting portion 121 thereof is moved outwardly the opposite end portion 123 will move the actuating arm of a limit switch LS-1 to activate the control circuitry and initiate the tilting of the turntable. The movement of the end portion 123 of the spring arm is limited, as shown in FIG. 2, by a stop post 125, and a resilient O-ring 126 is connected between the said end portion 123 and the hinge bracket structure 124 to normally bias the spring arm in a counterclockwise direction (as viewed in FIG. 2).

The circuitry for accomplishing the discharging movement of the turntable 12 and the accumulating movement of the discharge conveyor 14 is shown in the electrical schematic diagram of FIG. 6. To understand the symbols used in the diagram, it should be noted that the numbers following the contacts C relate those contacts to the similarly numbered relays RY or TD whose energization determines the actuated position of the related contacts—the contacts being shown in their "normal," or un-energized, condition in the diagram.

Initially, an on-off switch SW-1 is closed to provide power from the input lines 130 to the control circuitry of the present invention and to start the motor M1 which rotates the turntable. When the limit switch LS-1 is closed upon the accumulation of a full load of fruit F upon the turntable, a relay RY-1 will be energized which will close its contact C-1A to provide power to a solenoid SOL-1. This solenoid operates a conventional air valve (not shown) which will cause air to be delivered to the pneumatic cylinder 84 in a manner to extend the piston rod 82 and thereby tilt the turntable 12 upwardly. The energization of relay RY-1 also closes the holding contact C-1C and a contact C-1B which energizes a time delay relay TD-3. This time delay relay, once energized, will close its contact C-3 only after a predetermined period of time which, in the present case, is adjusted to about one or two seconds. The closing of contact C-3 provides power to start the brake motor M2 which drives the discharge conveyor 14. Thus, it will be recognized that a short delay is provided once the turntable starts to lift in order to provide time for the fruit to begin to gravitate off of the turntable and over the support plate 52 before the discharge conveyor 14 will begin to move. In this manner, all of the available space will be filled on the discharge conveyor, and the discharge conveyor will start to move at the proper time so that the fruit will accumulate uniformly thereon without exerting undue pressure on the fruit already accumulated.

The elevation of the frame structure 30 and the supported turntable 12 continues along with the movement of the discharge conveyor 14 for a predetermined period of time. This predetermined period of time is provided by a time delay relay TD-4 which is connected in parallel with the drive motor M2 for the discharge conveyor and will be just enough time so that the entire load of fruit from the turntable will fit upon the surface of the discharge conveyor and fill it. At the end of this predetermined period of time, which in the present case amounts to about 6 seconds, the relay TD-4 opens a pair of normally closed contacts C-4A and C-4B to remove power from the solenoid SOL-1 and stop the movement of the piston rod 82 in the pneumatic cylinder 84. Relay TD-4 also closes a normally open contact C-4C to energize a second solenoid SOL-2 which reverses the input and discharge of air in the pneumatic cylinder 84 so as to cause the piston rod 82 to retract and thereby lower the turntable. The closing of contact C-4C also energizes relay RY-5 which closes the holding contact C-5 to maintain the circuit to the solenoid SOL-2. The piston rod 82 will continue to be retracted until the frame structure 30 reaches its initial horizontal orientation and actuates a normally closed limit switch LS-2 (shown only in the schematic diagram of FIG. 6) to open the switch and break the circuit to the solenoid SOL-2. The turntable 12 will then be ready to receive a new load of fruit.

From the operational views of FIGS. 4 and 5 it will be seen that the stop plate 98 will be pivoted upwardly immediately upon the initiation of the upward movement of the frame structure 30 so as to block the further movement of any fruit into the accumulator. Alternatively, the downwardly depending skirt 50a of the support plate 50 might be used to block the delivery of fruit to the accumulator if the pinching action between the upwardly moving skirt and the stationary delivery ramp is not detrimental to the fruit or other articles being accumulated. Furthermore, if the maximum number of fruit which might be accumulated against the stop plate 98 during the period of time which it takes to elevate and lower the turntable 12 is great enough so as to possibly cause damage to the fruit, auxiliary diverting systems for recirculating such fruit in a separate conveyor system might be provided. Such auxiliary diverting systems obviously could be controlled by and operated in conjunction with the discharge of articles from the turntable.

From the foregoing description, it will be seen that the accumulator of the present invention is a non-complex, and therefore relatively inexpensive, structure which nevertheless will operate effectively and efficiently to continuously accumulate fragile articles. The turntable may be made quite large to handle a large quantity of articles, and in the practice of the present invention a turntable has been built and oeprated to accumulate at one time about 100 whole peeled grapefruit. By adjusting the rotational speed of the turntable the movement of the articles into the turntable can be closely controlled so that their motion is changed from a linear motion into a spiral motion so that they will gently move into the accumulated pile of articles at the center of the turntable. The discharge conveyor 14, which operates in conjunction with the turntable in the manner set forth hereinbefore, may be made of any length which is sufficient to handle the expected number of accumulated articles during any one processing run.

Although the best mode contemplated for carrying out the present invention has been herein shown and described, it will be apparent that modification and variation may be made without departing from what is regarded to be the subject matter of the invention.

What is claimed is:

1. Apparatus for accumulating fragile articles received at random from a delivery conveyor, said apparatus comprising a turntable mounted for rotation about a vertical axis and having a radially inwardly sloping article supporting surface, said turntable being normally positioned adjacent to said delivery conveyor so that said articles are delivered onto said surface from said delivery conveyor, means for continuously rotating said turntable as said articles are fed thereto so that said articles will gravitate to the center of the turntable in a generally uniform radial distribution, means for sensing when the turntable is filled with accumulated articles, and means operable upon the actuation of said sensing means for elevating the turntable to cause the accumulated articles to gravitate therefrom.

2. Apparatus for accumulating fragile articles as set forth in claim 1 including means mounting said turntable for pivotal movement adjacent a portion of the circumferential edge thereof, said means for elevating said turntable being operable to pivot the turntable upwardly about said portion of the circumferential edge.

3. Apparatus for accumulating fragile articles as set forth in claim 2 wherein said portion of the circumferential edge of the turntable is located diametrically opposite to the location of the interface of said delivery conveyor and said turntable.

4. Apparatus for accumulating fragile articles as set forth in claim 3 including means operable upon the elevation of said turntable for blocking the discharge of articles from said delivery conveyor.

5. Apparatus for accumulating fragile articles as set forth in claim 4 wherein said means for blocking the discharge of articles from said delivery conveyor comprises a plate, means for pivotally mounting said plate so that it normally forms a ramp for permitting said articles to move from said delivery conveyor to said turntable, and means operatively connected to said turntable for causing said plate to pivot about its pivotal mounting upon the elevation of said turntable so that the plate will be placed in a position to block the discharge of articles from said delivery conveyor.

6. Apparatus for accumulating fragile articles as set forth in claim 3 including a rigid frame for mounting said turntable and said means for rotating said turntable, a first flat article supporting plate fixed to said frame and extending to said delivery conveyor when the turntable is in its normal lowered position, and a second flat article supporting plate fixed to said frame at a position diametrically opposite from said first article supporting plate, said second article supporting plate having an inner edge portion positioned directly adjacent to said turntable at the outer circumferential edge thereof and an outer edge portion, said means for mounting said turntable for pivotal movement comprising means for mounting said frame for pivotal movement about the outer edge portion of the second article supporting plate.

7. Apparatus for accumulating fragile articles as set forth in claim 1 wherein said sensing means comprises a switch actuating arm positioned at the outer peripheral edge of the turntable in a position to be engaged by said fragile articles when they occupy said turntable at said outer peripheral edge thereof.

8. Apparatus for accumulating fragile articles received at random from a delivery conveyor, said apparatus comprising a turntable mounted for rotation about a vertical axis and having a radially inwardly sloping article supporting surface, said turntable being normally positioned adjacent to said delivery conveyor so that said articles are delivered onto said surface from said delivery conveyor, means for continuously rotating said turntable as said articles are fed thereto so that said articles will gravitate to the center of the turntable in a generally uniform radial distribution, means for sensing when the turntable is filled with accumulated articles, a discharge conveyor positioned adjacent said turntable at a position remote from said delivery conveyor, means operable upon the actuation of said sensing means for elevating the turntable to cause the accumulated articles to gravitate to said discharge conveyor, and means for intermittently driving said discharge conveyor in increments corresponding to the distance on said discharge conveyor which is necessary to accommodate the accumulated full load of articles from said turntable, said means for driving said discharge conveyor being operatively connected to said sensing means so that said discharge conveyor will be moved as said turntable is elevated to permit the articles to be uniformly distributed onto said discharge conveyor.

9. Apparatus for accumulating fragile articles according to claim 8 including means mounting said turntable for pivotal movement about a portion of the circumferential edge thereof which is adjacent to said discharge conveyor, said means for elevating said turntable being operable to pivot the turntable upwardly about said portion of the circumferential edge.

10. Apparatus for accumulating fragile articles according to claim 9 wherein said portion of the circumferential edge of the turntable is located diametrically opposite to the location of the interface of said delivery conveyor and said turntable.

11. Apparatus for accumulating fragile articles according to claim 10 including means operable upon the elevation of said turntable for blocking the discharge of articles from said delivery conveyor.

12. Apparatus for accumulating fragile articles according to claim 10 including a rigid frame for mounting said turntable and said means for rotating said turntable, a flat article supporting plate fixed to said frame, said article supporting plate having an inner edge portion positioned directly adjacent to said turntable at the outer peripheral edge thereof and an outer edge portion, said means for mounting said turntable for pivotal movement including means for mounting said frame for pivotal movement about the outer edge portion of the article supporting plate.

13. Apparatus for accumulating fragile articles according to claim 12 wherein said means for rotating said turntable comprises a motor mounted on said rigid frame.

14. Apparatus for accumulating fragile articles according to claim 12 wherein said discharge conveyor comprises a horizontally arranged endless belt conveyor positioned adjacent to said outer edge portion of said article supporting plate so as to receive the articles which gravitate therefrom.

15. Apparatus for accumulating fragile articles according to claim 8 wherein said sensing means comprises a switch actuating arm positioned at the outer peripheral edge of the turntable in a position to be engaged by said fragile articles when they occupy said turntable at said outer peripheral edge thereof.

* * * * *

UNITED STATES PATENT OFFICE
CERTIFICATE OF CORRECTION

PATENT NO. : 3,848,724
DATED : November 19, 1974
INVENTOR(S) : WILBER C. BELK

It is certified that error appears in the above-identified patent and that said Letters Patent are hereby corrected as shown below:

Column 5, line 25 - change "port on" to -- portion --.

Column 7, line 61 - change "oe-" to -- op- --.
          line 62 - change "prated" to -- erated --.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*